United States Patent [19]
Benjey

[11] Patent Number: 5,950,655
[45] Date of Patent: Sep. 14, 1999

[54] MECHANICAL SEAL ORVR SYSTEM AND CONTROL VALVE

[75] Inventor: Robert P. Benjey, Dexter, Mich.

[73] Assignee: G.T. Products, Inc., Ann Arbor, Mich.

[21] Appl. No.: 08/794,823

[22] Filed: Feb. 4, 1997

[51] Int. Cl.⁶ .................................................. F16K 24/04
[52] U.S. Cl. ............................ 137/43; 137/202; 137/587
[58] Field of Search ............................... 137/43, 202, 587

[56] References Cited

U.S. PATENT DOCUMENTS

| | | | |
|---|---|---|---|
| 4,982,757 | 1/1991 | Ohasi et al. | 137/202 |
| 5,590,697 | 1/1997 | Benjey et al. | 137/43 X |
| 5,669,361 | 9/1997 | Weissinger et al. | 137/587 X |
| 5,755,252 | 5/1998 | Bergsma et al. | 137/43 X |
| 5,769,057 | 6/1998 | Hashimoto et al. | 137/587 X |
| 5,782,258 | 7/1998 | Herbon et al. | 137/587 X |

*Primary Examiner*—Gerald A. Michalsky
*Attorney, Agent, or Firm*—Young & Basile, P.C.

[57] ABSTRACT

An onboard refueling vapor recovery (ORVR) system for a vehicle fuel system having a fuel tank, a mechanically sealed filler neck which receives a filler nozzle, and a vapor recovery apparatus such as a carbon canister. The system includes a nozzle shutoff line connecting the fuel tank with the filler neck to trigger the automatic shutoff mechanism of the filler nozzle when the level of fuel in the tank reaches a predetermined level. The system also includes a liquid-responsive control valve permitting venting of fuel vapor from the tank during both refueling and normal vehicle operating states when the fuel level in the tank is at or below the full level established by the nozzle shutoff line.

3 Claims, 3 Drawing Sheets

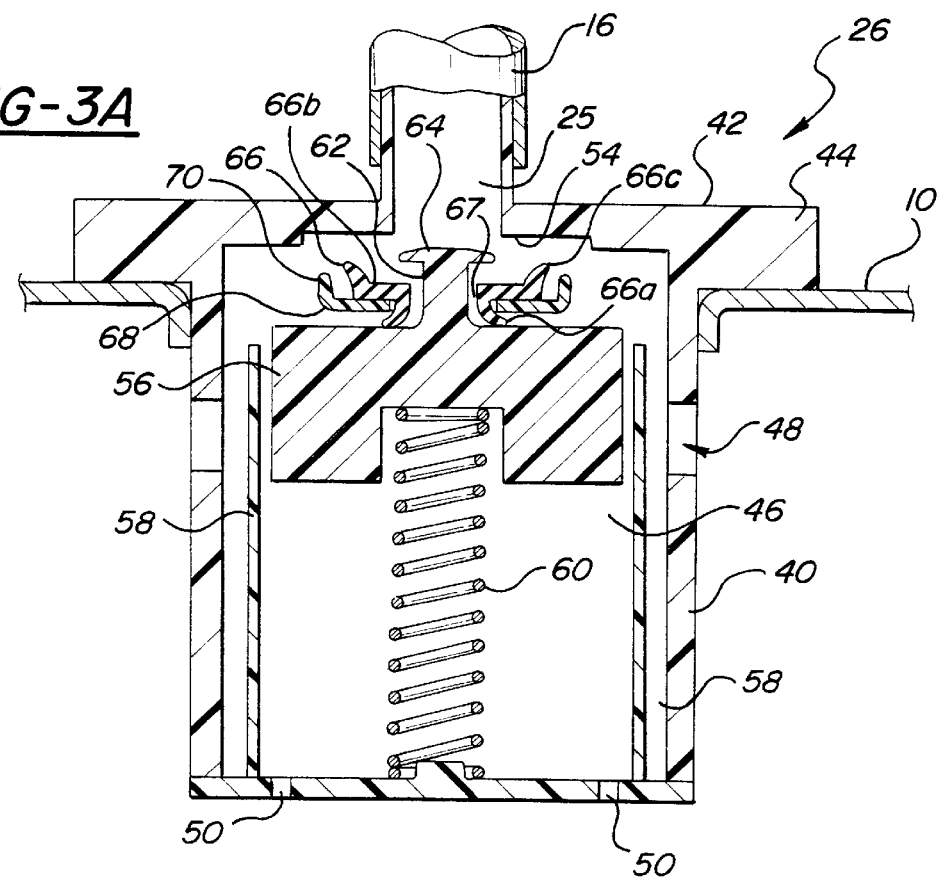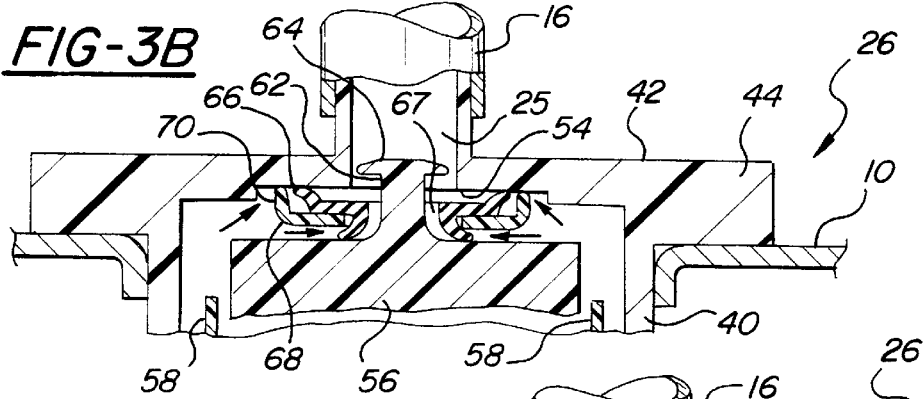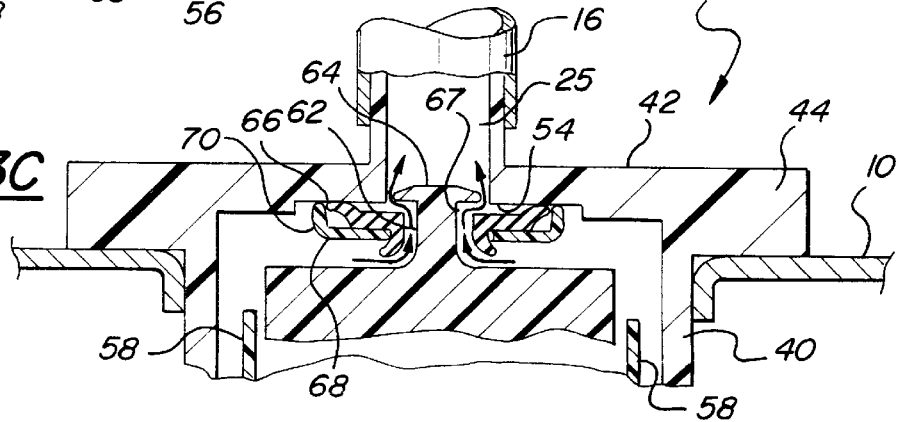

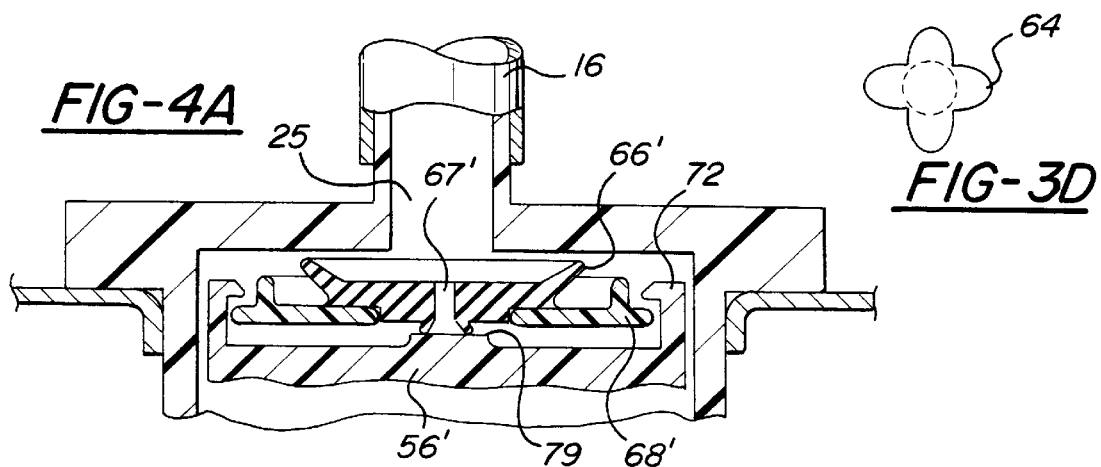
*FIG-4A*
*FIG-3D*
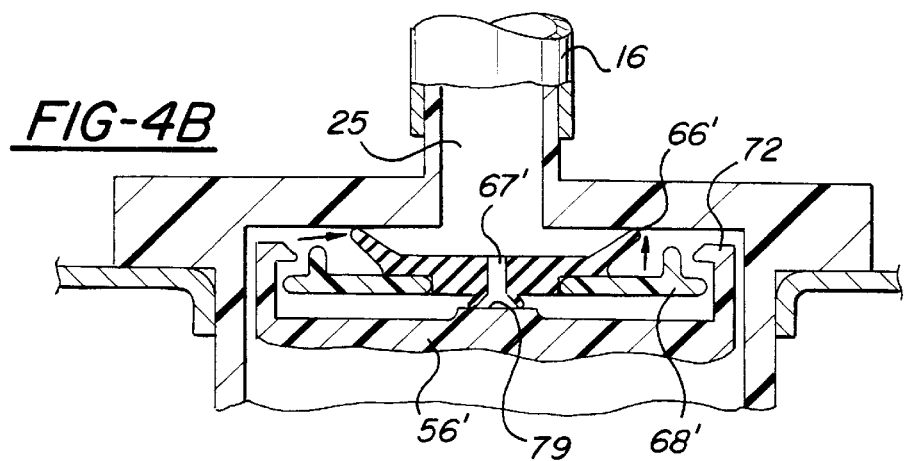
*FIG-4B*
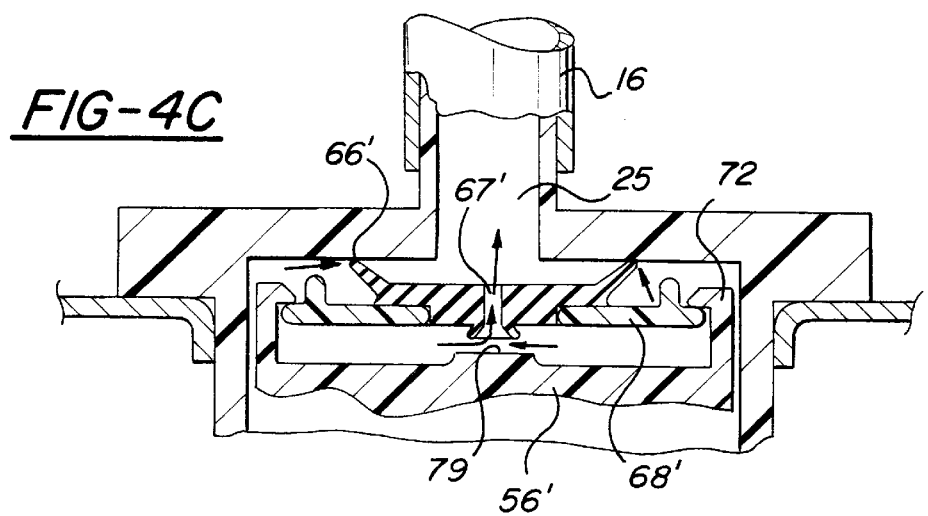
*FIG-4C*

MECHANICAL SEAL ORVR SYSTEM AND CONTROL VALVE

FIELD OF THE INVENTION

The present invention relates generally to "onboard" type fuel vapor recovery systems for vehicle fuel tanks, wherein fuel vapor generated during the refueling process is vented to onboard vapor recovery apparatus such as a carbon canister.

BACKGROUND OF THE INVENTION

Onboard refueling vapor recovery (ORVR) systems for controlling the flow of fuel vapor from a vehicle fuel tank to a recovery apparatus such as a carbon canister are generally known. A common approach is to place a control valve in series between the fuel tank and the canister to selectively open and close the vapor venting pathway in response to changes in vehicle refueling activity.

Some known ORVR control valves use a diaphragm which opens during refueling so that the fuel vapor displaced by the introduction of liquid fuel into the tank is allowed to vent to the vapor canister. An example of a diaphragm-operated valve is shown in U.S. Pat. No. 4,714,172 to Morris.

Filler nozzles used at many commercial filling stations have diaphragm-operated shutoff mechanisms which require a supply of make-up air or vapor to continue delivering fuel, and which automatically shut off when the make-up air supply is cut off. Make-up air is typically supplied by a nozzle shutoff line extending into the fuel tank to the full fuel level, and shutoff occurs when the shutoff line is covered by liquid fuel when the tank is full.

If the fuel in the tank is hot when refueling begins, the introduction of cold fuel from an offboard supply causes the hot fuel vapor in the tank to contract as it cools. This contraction can create vacuum conditions inside the tank which tend to interfere with the operation of pressure-operated diaphragm valves. Certain types of diaphragm-operated ORVR valves may prematurely close during refueling in response to these vacuum conditions. Diaphragm shutoff mechanisms in the filler nozzle can also be affected to prematurely close, interrupting the refueling operation.

One solution for preventing vacuum induced premature shutoff involves providing a vacuum relief bypass somewhere in the ORVR system. This, however, can introduce added complexity with attendant increases in both cost and likelihood of valve failure modes.

SUMMARY OF THE INVENTION

The present invention is an onboard refueling vapor recovery (ORVR) system for a vehicle fuel system including a fuel tank, a vapor trap, and a filler pipe having a mechanical seal with the filler nozzle. In general the system of the present invention includes a nozzle shutoff line connecting the fuel tank with the fuel filler pipe, and a normally open rollover valve between the fuel tank and the vapor canister. The nozzle shutoff line permits make-up air or vapor pressure to flow from the fuel tank to the filler pipe during refueling until the fuel level in the tank rises to cover the nozzle shutoff line.

The vapor venting path from the tank to the canister is normally left open by the rollover valve, which closes only during rollover or fuel slosh conditions, or if the filler nozzle shutoff mechanism fails. Complicated ORVR valve structures, particularly those affected by vacuum, are eliminated. Vacuum in the tank is relieved through the normally open venting path to protect against premature nozzle shutoff during refueling.

The rollover valve in a preferred form features two-stage decorking means to allow the valve to reopen when the vehicle has returned to an upright orientation, despite the presence of any tank canister pressure differential tending to hold the valve closed.

In a preferred embodiment of the invention the two-stage decorking function is provided by a novel annular seal on a rollover float assembly in the fuel tank. In the valve closed position, the float sealingly closes a central opening of the annular seal, while the outer periphery of the annular seal makes sealing contact with a valve seat around the venting path. When the vehicle returns to upright or the liquid fuel level subsides, the rollover float drops relative to the annular seal to open the central opening and reduce the tank/canister pressure differential tending to hold the annular seal against the valve seat. This pressure reduction allows the weight of the float to pull the annular seal off the valve seat and open fully.

These and other features of the invention will become apparent upon further reading of the specification.

BRIEF DESCRIPTION OF THE DRAWINGS

FIG. 3a is a section view of an inventive control valve employed in the system of FIG. 1, shown in the open condition;

FIG. 3b illustrates the valve of FIG. 3a in a fully closed position;

FIG. 3c illustrates the valve of FIG. 3a in a first stage opened condition;

FIG. 3d is a plan view of a portion of the valve element shown in FIGS. 3a–3c.

FIG. 4a is a section view of a second embodiment of an inventive control valve employed in the system of FIG. 1;

FIG. 4b illustrates the valve of FIG. 4a in a fully closed position; and

FIG. 4c illustrates the valve of FIG. 4a in a first stage opened condition.

DETAILED DESCRIPTION OF THE INVENTION

Figure 1:
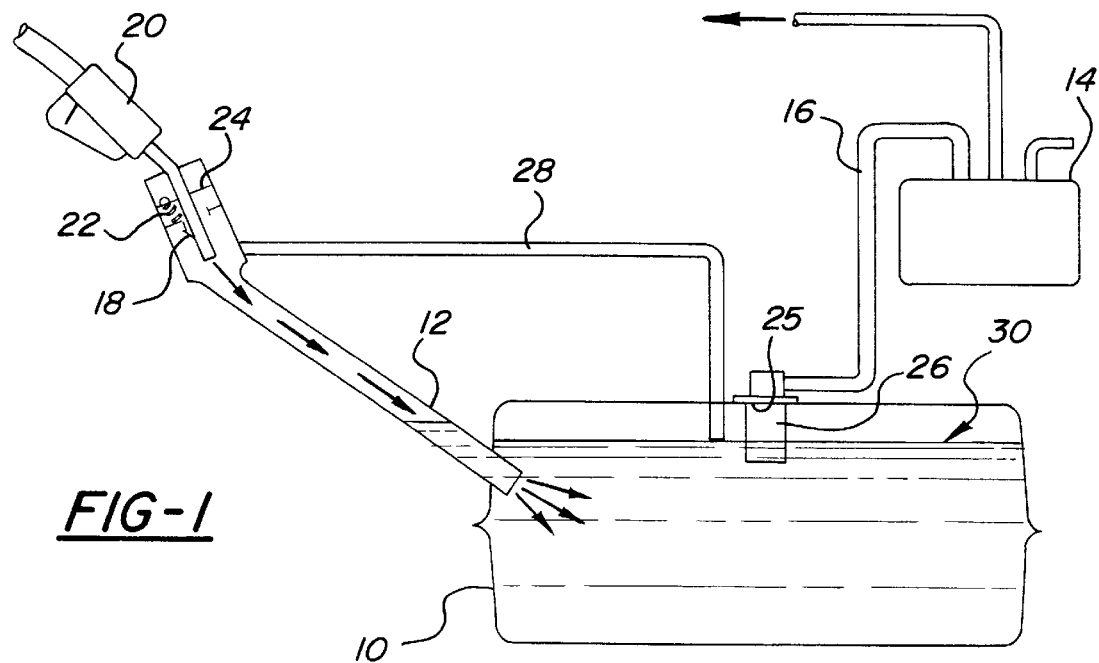
FIG. 1 is a schematic illustration of a vehicle fuel system with an onboard vapor recovery system according to the present invention.
Figure 2:
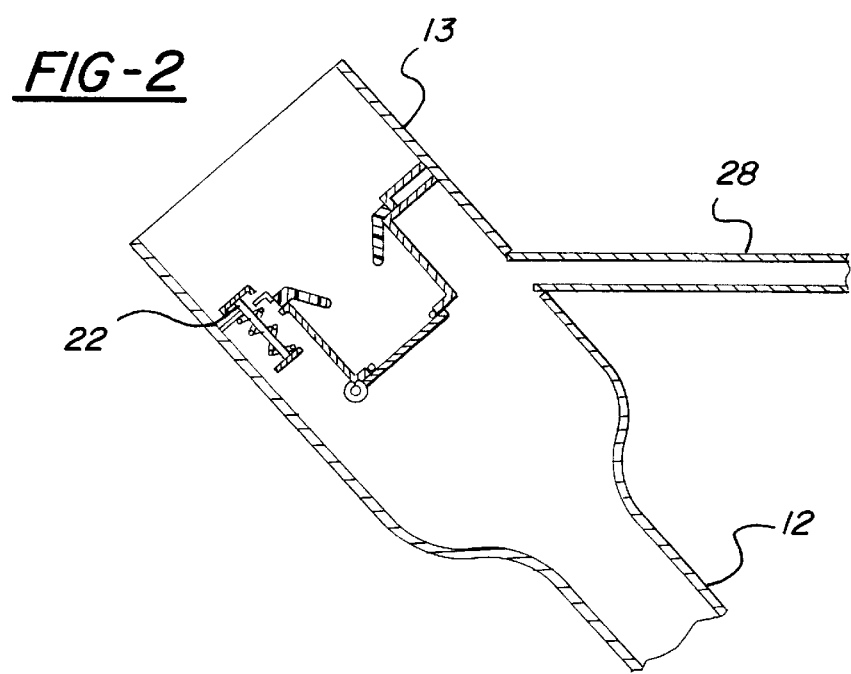
FIG. 2 is a schematic representation of a mechanical seal in the filler neck area of the vehicle fuel system shown in FIG. 1.

Referring now to FIGS. 1 and 2, an onboard vapor recovery system according to the present invention is shown for a vehicle fuel system comprising a tank 10, a filler pipe 12, and a vapor canister 14 connected to tank 10 by a vent line 16. The filler pipe 12 has an inlet at upper end 13 to accept a filler nozzle 20 for refueling. Filler pipe 12 is closed against escape of fuel vapor from tank 10 by a vaportight mechanical seal partition having a seal door 18 which is forced to an open position by introduction of filler nozzle 20 in upper end 13. A relief valve 22 is provided as a bypass to trap door seal 18, providing both pressure and failed nozzle relief. An annular nozzle seal 24 associated with seal door 18 fits tightly around the inserted filler nozzle 20 to minimize leakage of fuel vapor from tank 10 during refueling.

Fuel vapor from tank 10 is vented through a venting path defined by line 16 to canister 14, where it is adsorbed and periodically purged to the engine for combustion in known manner. Fuel vapor from the tank enters line 16 via a vent aperture 25 in the tank. A rollover control valve 26 is mounted in the tank in association with vent aperture 25 to selectively close vapor venting from the tank to the canister through line 16. In the illustrated embodiment rollover control valve 26 includes a liquid-and gravity-responsive float element with seal structure at its upper end to close vent aperture 25 when the float is forced against the aperture. During normal vehicle operation and refueling activity, rollover control valve 26 remains open, even when liquid fuel is at the full level as shown in FIG. 1. Valve 26 closes if the vehicle tilts or rolls over, or if fuel sloshes significantly above the full level, in which cases gravity and/or the liquid fuel force the float and its seal structure against aperture 25 (or an associated valve seat) to block any flow of liquid fuel to the canister.

Valve 26 can also serve an overfill protection function, closing to prevent liquid fuel from entering the canister if the shutoff mechanism in the filler nozzle fails and fuel continues to be pumped into tank 10 after it is full.

Valve 26 is therefore a normally open valve, such that fuel vapor flows freely from the tank to the canister during vehicle refueling and normal operation. This normally open condition distinguishes it from prior art control valves, which employ valve structure to open during refueling and close during vehicle operation (onboard-type valves), or vice versa (running loss type valves).

A nozzle shutoff line 28 communicates fuel vapor from tank 10 to filler pipe 12 below seal door 18. The fuel tank end of shutoff line 28 is positioned in tank 10 to establish a full fuel level, indicated at 30 in FIG. 1. When the level of fuel in tank 10 is below full level 30, the fuel tank end of nozzle shutoff line 28 is open to the vapor space above the fuel in tank 10. This allows make-up air or vapor to pass through nozzle shutoff line 28 from tank 10 to filler pipe 12 and filler nozzle 20 during refueling. The automatic shutoff mechanism of fuel filler nozzle 20 is sensitive to pressure conditions and requires the supply of make-up air to continue fuel delivery. When the level of fuel in tank 10 reaches full level 30 and covers the fuel tank end of nozzle shutoff line 28, the supply of make-up air is cut off and the automatic shutoff mechanism terminates fuel delivery from filler nozzle 20. This signals the nozzle operator that the tank is full.

If the delivery of fuel continues past this point due to malfunction of filler nozzle 20 or misuse by the nozzle operator, such as by "clicking" the filler nozzle operating handle, the level of fuel will continue to rise above full level 30 and will eventually close rollover control valve 26 to prevent passage of liquid fuel through vent line 16 to vapor canister 14.

If fuel continues to be pumped into the tank even after valve 26 closes, pressure relief valve 22 in upper end 13 of the filler pipe will open at a predetermined pressure to prevent internal damage to the system or the spraying of fuel out of filler pipe 12 through nozzle seal 24. Pressure relief valve 22 also vents any excess pressure build up during vehicle operation, for example if rollover valve 26 were in a closed position in an overfilled tank and the pressure inside tank 10 increased due to an increase in temperature.

Referring now to FIGS. 3a–3d, a first embodiment of a rollover control valve 26 suitable for the system of FIG. 1 is illustrated. Valve 26 comprises an essentially hollow valve body mounted in a suitable aperture in the fuel tank. Lower portion 40 of the valve is located in the interior of the fuel tank, and can either define or communicate with venting aperture 25. The valve is fastened to the fuel tank to be liquid- and vapor-tight in known manner, for example, by hot plate welding, ultrasonic welding, grommet-type seal, or other known techniques.

Control valve 26 defines a float chamber 46 open at its lower end to receive liquid fuel if the vehicle becomes inverted or if the fuel level in tank 10 rises to cover valve 26 during refueling or sloshing. Radial vent ports 48 and holes 50 in the bottom end of lower half 40 provide vapor and liquid communication between tank 10 and the hollow interior of the valve. At its upper end float chamber 46 includes or communicates with vent aperture 25 connected by vent line 16 to vapor canister 14. An annular valve seat 54 is defined at the periphery of vent aperture 25.

Control valve 26 can be provided with baffle structure 58 associated with vent ports 48 in chamber 46 to prevent liquid fuel from splashing through radial holes 48 into vent aperture 25.

A fuel level responsive float 56 is contained in chamber 46 for up and down movement as the float chamber fills with liquid fuel through holes 48 and/or 50. The density of float 56 is balanced relative to that of the fuel with a spring 60 such that it closes when immersed in liquid fuel in both upright and rollover situations.

The upper end of float 56 defines a cylindrical stem 62 having an enlarged upper end 64. An annular seal 66 with a center hole 67 fits loosely over stem 62 and is retained thereon by enlarged upper end 64. Seal 66 is preferably made of a deformable, fuel-resistant material such as rubber or plastic, and is press-fit into the circular opening on a rigid support plate 68. The central opening 67 in plate 68 preferably has a diameter larger than the enlarged upper end 64 of stem 62. Plate 68 can take the form of an uninterrupted disk as illustrated, or can take other forms as desired, provided it adequately supports seal 66. Support plate 68 has an upturned outer shoulder or rim 70 radially outward of the outer most portion of seal 66, and having a height less than the uppermost edge of seal 66 in the open condition as shown in FIG. 3a.

If the vehicle containing the fuel system should become sharply tilted or inverted, for example by reason of a rollover accident, the weight of float 56 and the force applied by spring 60 will move float 56 and the seal assembly to a closed condition shown in FIG. 3b, with seal ring 66 pressed into valve seat 54 by float 56 to effect a fuel-tight seal. Rollover valve 26 will also close if the level of fuel in tank 10 rises significantly above full level 30 due to fuel slosh or a malfunctioning automatic shutoff on filler nozzle 20. In the closed condition the outer shoulder 70 of plate 68 abuts valve seat 54 to prevent seal 66 from being over-compressed by the valve closing force. This prevents seal 66 from being cut or damaged, or from losing its seal with the valve seat.

After rollover valve 26 has closed to isolate tank 10 from vapor canister 14, the pressure differential between fuel tank 10 and vapor canister 14 across the seal assembly tends to inhibit the reopening of rollover valve 26 after the rollover or overfill conditions have been removed. Rollover valve 26 has a two-stage opening feature to overcome the tendency of this pressure differential to hold the valve closed or cause it to "hang up".

When the vehicle has returned to the upright orientation, or when the level of fuel in tank 10 has dropped below the overfill condition, the relatively high pressure in tank 10 tends to hold the seal assembly against valve seat 54. However, because the height of stem 62 between the top of float 56 and upper end 64 is greater than the distance from lower lip 66a to center surface 66b of seal 66, float 56 will move downward relative to the closed seal assembly under its own weight to the position shown in FIG. 3c, thereby effecting the first stage of valve opening. Once the seal between lower lip 66 and the float is broken, a relatively small annular passage is created between center hole 67 of seal 66 and stem 62. This passageway allows pressure to vent from tank 10 into vent line 16, providing an initial decrease in the pressure differential across the seal assembly. This initial pressure reduction allows the weight of float 56 to de-cork the seal assembly to the position shown in FIG. 3a. Depending on ambient conditions and the relative dimensions of the vent aperture, the seal assembly, the float and the stem, the seal assembly may even de-cork itself before the float drops to the point where upper end 64 contacts seal 66. This second-stage opening puts control valve 26 in a fully open condition to permit fuel vapor to vent freely to vapor canister 14.

A second embodiment of a rollover valve capable of use in the system of FIG. 1 is shown in FIG. 4. In this embodiment, the upper end of float 56' has a plurality of upwardly extending circumferentially spaced fingers 72 which hook inwardly to engage an outer edge of plate 68'. Seal 66' again includes an upper annular lip 66c which forms the primary seal with valve seat 54 a lower lip portion 66a' which forms a secondary seal with float 56', and a center passageway or hole 67' through which the initial pressure reduction occurs. The seal assembly comprising plate 68' and seal 66' is trapped within the cage defined by fingers 72 with sufficient axial (vertical) play that the seal between lower lip portion 66a' and float 56' is broken when fingers 72 engage the outer edge of plate 68'. A secondary valve seat 79 is located at the center of the top end of float 56' to make sealing contact with the lower lip of seal 66' when float 56' is forced upward. Under normal operating conditions, float 56' maintains the position shown in FIG. 4a with the seal assembly resting on float 56' away from valve seat 54' so that fuel vapor may pass freely between fuel tank 10 and vent line 16.

In the fully closed position of FIG. 4b, the periphery of seal 66' is forced against valve seat 54' and secondary valve seat 79 closes off center hole 67'. If a pressure differential between tank 10 and vent line 16 tends to hold the valve in a closed position, the first stage of valve opening occurs when float 56' moves downward relative to the seal assembly under its own weight to break the seal with center hole 67' and reduce the pressure differential across the seal assembly. After the pressure differential has been reduced sufficiently, the weight of float 56' pulling downward on plate 68' by means of fingers 72 breaks the seal between seal ring 66' and valve seat 54' to effect the second stage of valve opening as initially shown in FIG. 4c and as finally shown in FIG. 4a.

The system of the present invention accordingly achieves onboard control over vapor venting using a simplified valve arrangement, and is particularly useful for refueling a fuel system with a mechanically sealed filler pipe. The foregoing illustrative embodiments of this system and individual valves according to the present invention are exemplary in nature and the invention is not to be limited except as provided in the following claims.

I claim:

1. In a vehicle fuel system having a fuel tank, a filler pipe having an inlet end with a mechanical seal for a filler nozzle, and onboard vapor recovery apparatus, a fuel vapor venting and nozzle shutoff control system comprising:

a nozzle shutoff line having a first end communicating with the filler pipe between the mechanical seal and the tank to supply make-up air and/or vapor from the fuel tank to a filler nozzle inserted through the mechanical seal and a second end communicating with the fuel tank, the second end positioned to establish a full level of fuel in the tank by shutting off the supply of make-up air and/or vapor from the fuel tank to the filler nozzle when a full fuel level is reached;

a control valve mounted in the fuel tank to selectively close a vapor recovery passageway between the tank and the canister, the control valve having an open position in which the vapor recovery passageway is open to permit fuel vapor to flow from the tank to the canister and to permit vacuum flow from the canister to the tank, and a closed position in which the vapor recovery passageway is closed, the control valve including normally open rollover valve means for maintaining the control valve in the open position during refueling and normal vehicle operating states when the fuel level in the tank is at or below the full level.

2. A system as defined in claim 1, wherein the rollover means comprise liquid-responsive float valve means moveable from an open position above the full fuel level but below a valve seat associated with the vapor recovery passageway, to a closed position on the valve seat to close the vapor recovery passageway in response to fuel above the full fuel level.

3. A system as defined in claim 2, wherein the float valve includes seal means with a primary sealing surface for sealingly engaging the valve seat, the seal means including two-stage decorking means for reducing a tank/canister pressure differential across the seal means when the float valve moves toward the valve open position.

* * * * *

UNITED STATES PATENT AND TRADEMARK OFFICE
CERTIFICATE OF CORRECTION

PATENT NO : 5,950,655

DATED : September 14, 1999

INVENTOR(S): Robert P. Benjey

It is certified that error appears in the above-identified patent and that said Letters Patent is hereby corrected as shown below:

Column 6, line 27, delete "canister" and insert --onboard vapor recovery apparatus--.

Column 6, line 30, delete first occurrence of "canister" and insert --onboard vapor recovery apparatus--.

Column 6, line 30, delete second occurrence of "canister" and insert --onboard vapor recovery apparatus--.

Column 6, line 38, after "rollover" insert --valve--.

Column 6, line 39, after "comprise" insert --a--.

Column 6, line 39, after "valve" delete "means".

Column 6, line 40, after "from" delete "an" and insert --a float valve--.

Column 6, line 42, before "closed position" insert --float valve--.

Column 6, line 46, after "includes" insert --a--.

UNITED STATES PATENT AND TRADEMARK OFFICE
CERTIFICATE OF CORRECTION

PATENT NO. : 5,950,655
DATED : September 14, 1999
INVENTOR(S) : Robert P. Benjey It is certified that error appears in the above-identified patent and that said Letters Patent is hereby corrected as shown below:

```
Column 6, line 46, after "seal" delete "means".
Column 6, line 47, after "seal" delete "means".
Column 6, line 49, after "seal" delete "means".
```

Signed and Sealed this

Eleventh Day of April, 2000

Attest:

Attesting Officer

Q. TODD DICKINSON

Director of Patents and Trademarks